No. 711,361. Patented Oct. 14, 1902.
G. E. STEPHENSON.
THEATRICAL LIGHTING.
(Application filed July 26, 1901.)
(No Model.) 2 Sheets—Sheet 1.
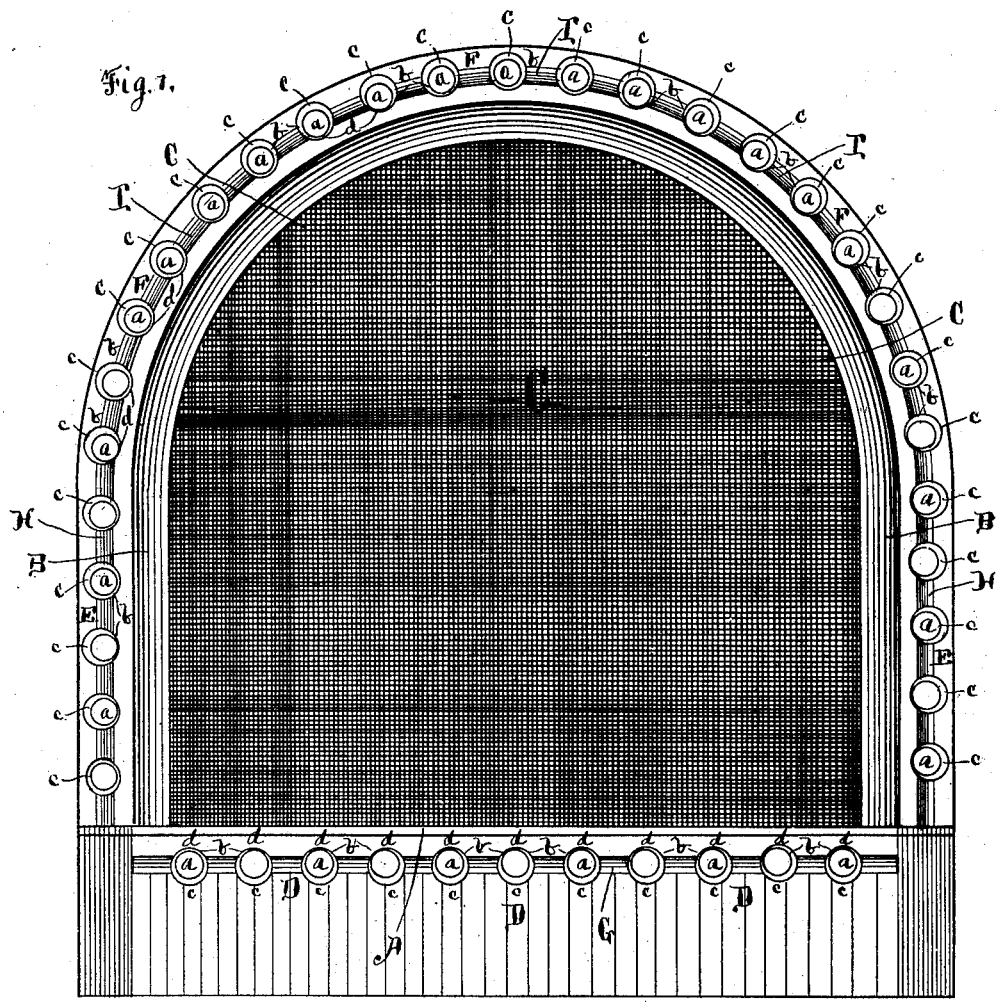
Witnesses
Samuel W. Banning
Thomas B. McGregor
Inventor.
George E. Stephenson
By Banning & Banning,
Attys.

No. 711,361. Patented Oct. 14, 1902.
G. E. STEPHENSON.
THEATRICAL LIGHTING.
(Application filed July 26, 1901.)
(No Model.) 2 Sheets—Sheet 2.
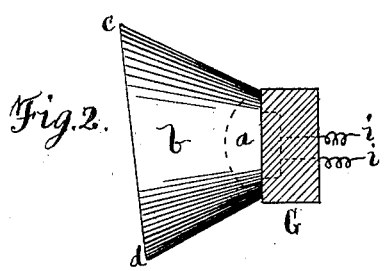
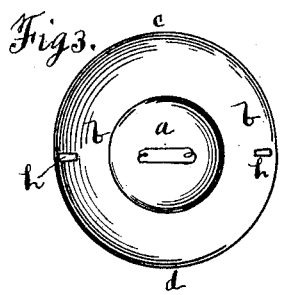
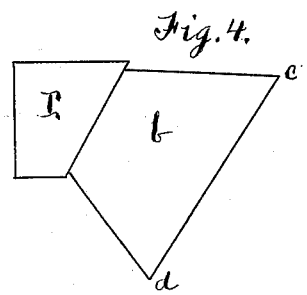
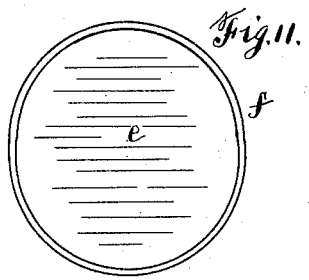
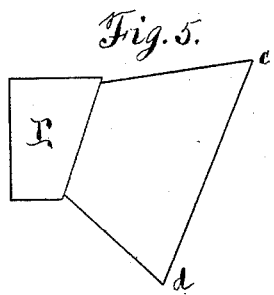
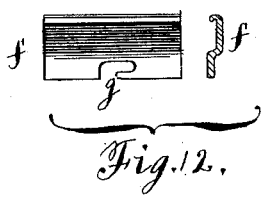
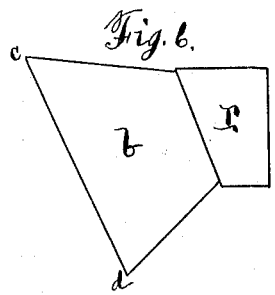
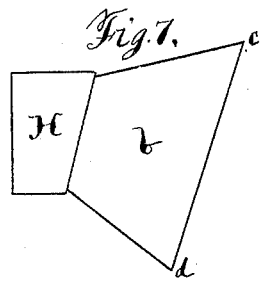
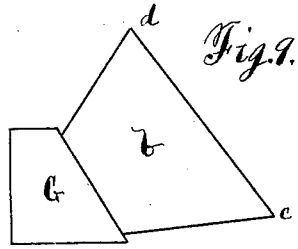
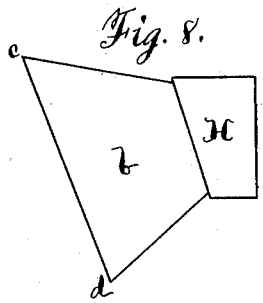
Witnesses
Samuel W. Banning
Thomas B. McGregor
Inventor.
George E. Stephenson
By Banning & Banning
Att'ys.
THE NORRIS PETERS CO., PHOTO-LITHO., WASHINGTON, D. C.

UNITED STATES PATENT OFFICE.

GEORGE E. STEPHENSON, OF CHICAGO, ILLINOIS, ASSIGNOR TO JACOB LITT, OF NEW YORK, N. Y.

THEATRICAL LIGHTING.

SPECIFICATION forming part of Letters Patent No. 711,361, dated October 14, 1902.

Application filed July 26, 1901. Serial No. 69,808. (No model.)

*To all whom it may concern:*

Be it known that I, GEORGE E. STEPHENSON, a citizen of the United States, residing at Chicago, in the county of Cook and State of Illinois, have invented a certain new and useful Improvement in Theatrical Lighting, of which the following is a specification.

It is desirable and in many instances necessary in order to produce the proper scenic effect in theaters that the space in front of the proscenium-arch, where the audience is seated, should be in light while the space back of the proscenium-arch for the stage should be in darkness, and for the best result the lighting arrangement should be one in which the rays of light can be thrown forward of the proscenium-arch without having any light projected back of the arch on the stage.

The primary and principal object of this invention is to so construct the lights for the proscenium-arch as to enable the space in front of the arch to be lighted while the space back of the arch remains in darkness, and this without changing the nature of the lights around the proscenium-arch, as to raising and lowering, the lights remaining intact so far as concerns their normal condition; and the invention consists in the features of construction, the arrangement of the lights, and the combination of parts hereinafer described, and pointed out in the claims.

In the drawings illustrating the invention only so much of a theater as is necessary for a clear understanding of the invention and its application to a proscenium-arch is shown, and for this reason the proscenium-arch and the front edge of the stage, with the lights arranged in accordance with the invention, is all that is represented in the main figure of the drawings.

In the drawings, Figure 1 is an elevation showing the proscenium-arch, the front edge of the stage, and the lights arranged on the arch and at the front of the stage; Fig. 2, a side elevation of a lamp and its shade-reflector with the backing or strip to which the lamp and its shade-reflector are attached in section; Fig. 3, a front elevation of a lamp and its shade; Figs. 4, 5, 6, 7, 8, and 9 outline views showing the position on the proscenium-arch of the series of lamps for the footlights, the side lights, and the border or circle lights; Fig. 10, a sectional edge elevation of a lens or glass for use at the front of the shade-reflector; Fig. 11, a face view of the lens or glass of Fig. 10, mounted in its frame or ring; and Fig. 12 a plan view and an edge section of the frame for a lens, the plan view only showing a portion of the frame.

The stage A and the proscenium-arch B can be of any of the usual and well-known forms of construction and arrangement, so as to have a space C back of the arch for the stage and the scenery, as usual. The lights are arranged so as to have footlights D, side lights E, and circle or border lights F, these lights being arranged to suit the shape of the stage and the proscenium-arch. The footlights, side lights, and circle or border lights are each made up of a series of lamps, preferably electric lamps, each of which may have a bulb or globe of ground glass or other formation. Each lamp $a$ in the construction and arrangement shown has surrounding it a shade-reflector $b$, and each shade-reflector is of a circular cone shape, with the outer or base end cut on a diagonal line, so as to leave an advanced side or edge $c$ and a receded side or edge $d$, as shown in Fig. 2. This form of shade-reflector is essential in carrying out the invention, as it insures, in connection with the angle at which the lamps and shades are set, as hereinafter described, a projection of the rays of light from the lamp by which the space in front of the proscenium-arch will be illuminated or lighted while the space back of the arch on the stage will remain in darkness so far as concerns any light from the proscenium-arch.

The lamps $a$, with their shade-reflectors $b$, formed as described, are set for the footlights on a backing or strip G, located along the front of the stage. This backing or strip G has its front face on an incline, as clearly shown in Fig. 9, and the lamps and shades are set on the inclined face so as to have the receded side $d$ of each shade-reflector at the inside or top and the advanced side or edge $c$ at the outside or bottom in relation to the opening in the arch, with the result that the rays of light will be deflected and thrown forward into the space in front of the proscenium-arch, and no return or reflected ray will be produced, as the projecting side or edge c has such relation to the stage as to prevent any return ray from the arch-lights entering the space back of the proscenium-arch from the front thereof.

The lamps a, with their shade-reflectors b, formed as described, are set for the side lights on a backing or strip H, located on each side of the proscenium-arch, and each backing or strip has its front face on an incline, as clearly shown in Figs. 7 and 8, the inclination being the same for both sides of the arch and both inclinations facing inward, as shown in Figs. 7 and 8. The lamps and shades for each base or strip are set on the inclined face, so as to have the receded side or edge d of each shade-reflector on the inside and the advanced side or edge c on the outside in relation to the opening in the arch, with the result that the rays of light will be deflected and thrown forward into the space in front of the proscenium-arch and no return or reflected ray will be produced, as the projecting side or edge c is on the outside and has such relation to the stage and arch as to prevent any return ray from the arch-lights entering the space back of the arch from the front thereof.

The lamps a, with their shade-reflectors b, formed as described, are set for the circle or border lights on a backing or strip I, located on the circle of the proscenium-arch, starting from the side lights on each side, and this backing or strip has its receiving-face inclined, the angle of inclination varying with the circle of the arch. The lamps and shades are set on the inclined face so as to have the receded side d of each shade-reflector on the inside and the advanced side or edge c on the outside in relation to the opening in the arch, which will bring the upper lights so as to have the receded side at the bottom and the advanced side at the top, with the result that the rays of light will be deflected and thrown forward into the space in front of the proscenium-arch and no return or reflected ray will be produced, as the projecting side or edge c has such relation to the stage and the arch as to prevent any return ray from the arch-lights entering the space back of the arch from the front thereof.

It will be noticed that the lamps and shades encircling the proscenium-arch are arranged so that the projected side or edge of the shades will always be on the outside and the receded edge or side will be on the inside in relation to the opening of the arch, and the angle of inclination at which the lights are set is one by which the projected rays will be directed toward a common center, which should be located at a point above the audience in front of the stage and at a central line vertically of the arch, by which arrangement, owing to the projected side or edge of the shades being on the outside, no return ray or reflected light from the arch-lights and from the floor or ceiling in front of the arch can be thrown back of the arch onto the stage, leaving the stage in a condition of darkness, with the space in front of the arch lighted. This lighting enables the audience to be seen and at the same time shuts off a view of the stage by the audience, so that scenic changes can be made on the stage without being visible to the audience in so doing and the audience will not be left in darkness. It will be seen that with the plan of lighting of this invention the lights around the proscenium-arch need not be turned down or dimmed otherwise than their normal condition in making a change of scenes on the stage, with the result that no regulating or changing of the lights during the shifting of scenes on the stage is necessary and no special attention is required for the lights around the arch, which, if electric lights are used, can be turned fully on or turned out entirely, as required for the condition of the stage.

Each shade, if so desired, can have located in its front a lens or glass e, which may be ground or otherwise prepared to reduce the strength of the light. A double concave lens can be used where it is desired to prevent diffusion of the light to a greater extent than the diffusion produced by the shade-reflectors, and a lens of this description is shown in Fig. 10. The lens or glass can be mounted in a metallic or other suitable band or frame f and can be secured in the end of the shade-reflector by an ordinary bayonet-catch arrangement formed by a slot g in the edge of the frame or band and pins h inwardly projecting from the shade-reflector, as shown in Figs. 3 and 12, or the lens or glass can be secured in the shade-reflector in any other suitable detachable manner. The backing or strip on which the lamps are mounted can be made of wood or other suitable insulating material, and the current, where electric lights are employed, can be supplied to the lamps by conductors i and i', attached to the backing or strip or otherwise and connected with the lamps in any usual and well-known manner.

The essential feature of the invention is in the construction of the shade-reflector for the light so as to have a projected side or edge and a receded side or edge and then setting the lamp and shade at an angle of inclination always inward and so as to have the projected side or edge on the outside with the receded side or edge on the inside in relation to the opening in the proscenium-arch, and the angle of inclination will vary according to the height and width of the opening in the arch and the space for the audience in front of the arch; but in each instance the angle must be of a nature to direct or throw the rays forward to a central point, with the projecting side or edge acting as a guard to prevent return or reflected rays from in front of the proscenium-arch being thrown back onto the stage. The invention enables the lights of the proscenium-arch to remain in a lighted condition during scenic changes on the stage, so that the audience will be in light and the stage will be in darkness, and by means of the invention better effects can be produced, and changes can be made with the audience in the light and the changes invisible to the audience, and this without requiring any turning down or dimming of the lights around the proscenium-arch, which can be left to their full capacity, which is very desirable and important in the production of theatrical or scenic changes where the audience can be left in the light and the stage will be dark.

What I regard as new, and desire to secure by Letters Patent, is—

1. In theatrical lighting, the combination of a backing, a shade-reflector attached thereto having annular diverging side walls with their outer edges on an incline furnishing an advanced edge and a receded edge, a lamp within the reflector attached to the backing in line with the rear edge of the reflector and having a globe or bulb filling the circle of the opening at the base end of the shade-reflector, whereby all reflection comes from the sides of the reflector and the reflected rays of light from the side having the receded outer edge, are prevented from crossing the plane of the side having the advanced outer edge, substantially as described.

2. In theatrical lighting, a lamp, a shade-reflector encircling the lamp and having its outer edge on an incline furnishing an advanced edge or side and a receded edge or side, and a backing or strip having an inclined attaching-face to which the lamp and shade are attached to have the advanced edge of the shade fitted to the advanced edge of the inclined face, substantially as described.

3. In the lighting of a proscenium-arch, a footlight consisting of a series of lamps, each lamp having a shade-reflector with the outer edge of the shade or reflector on an incline furnishing an advanced edge or side and a receded edge or side, and a backing or strip for the lamps having an inclined attaching-face on which the lamps are set for the advanced edge or side of the shade to be on the outside and the receded edge or side to be on the inside in relation to the arch-opening preventing the throwing of return rays or reflected light back of the proscenium-arch and throwing the light entirely forward of the arch, substantially as described.

4. In the lighting of a proscenium-arch, a side light on each side of the arch each side light consisting of a series of lamps, each lamp having a shade-reflector with the outer edge on an incline furnishing an advanced edge or side and a receded edge or side, and a backing or strip having an inclined attaching-face on which the lamps and shades are set to have the advanced edge or side of the shade on the outside and the receded edge or side of the shade on the inside in relation to the arch-opening preventing the throwing of return rays or reflected light back of the proscenium-arch and throwing the light entirely forward of the arch, substantially as described.

5. In the lighting of a proscenium-arch, a border or arch light consisting of a series of lamps, each lamp having a shade-reflector with its outer edge on an incline furnishing an advanced edge or side and a receded edge or side, and a backing or strip having an inclined attaching-face for the lamps and shades and on which the lamps and shades are set to have the advanced side or edge of the shade-reflector on the outside and the receded side or edge of the shade-reflector on the inside in relation to the arch-opening preventing the throwing of return rays or reflected light back of the proscenium-arch and throwing the light entirely forward of the arch, substantially as described.

6. In the lighting of a proscenium-arch, a footlight, a side light on each side and a border or arch light, each light consisting of a series of lamps and each lamp having a shade-reflector with its outer edge on an incline furnishing an advanced edge or side and a receded edge or side, and a backing or strip for each series of lamps, each backing or strip having an inclined face on which the lamps and shades are set to have the shade-reflectors with their advanced edges on the outside and their receded edges on the inside in relation to the arch-opening preventing the throwing of return rays or reflected light back of the proscenium-arch and throwing the light entirely forward of the arch, and maintaining the space in front of the arch lighted and the space on the stage back of the arch in darkness, substantially as described.

7. In theatrical lighting a series of lamps, each lamp having a shade-reflector having annular diverging side walls with their outer edges on an incline furnishing an advanced edge or side and a receded edge or side and a backing for the lamps on which the lamps and shades are set to have their advanced edges on that side from which it is necessary to exclude the rays of light, substantially as described.

GEORGE E. STEPHENSON.

Witnesses:
THOMAS B. MCGREGOR,
SAMUEL W. BANNING.